UNITED STATES PATENT OFFICE.

FRANCIS STALING, OF HARRISONBURG, VIRGINIA.

IMPROVEMENT IN PAINT COMPOUNDS.

Specification forming part of Letters Patent No. 134,323, dated December 24, 1872.

*To all whom it may concern:*

Be it known that I, FRANCIS STALING, of Harrisonburg, in the county of Rockingham and State of Virginia, have invented certain Improvements in Paint, of which the following is a specification:

My invention relates to paints; and it consists in a novel composition and preparation of materials, as hereinafter explained. The object of my invention is to produce a cheap and durable paint to be used as a substitute for the lead paint now in general use, especially for painting the outside of buildings of all kinds, and which can also be used for inside painting in part or in whole, according to the finish required.

To prepare my paint, I take a quantity of pure white clay, such as is found in various parts of the country, especially in the vicinity of Harrisonburg, Virginia, and which very closely resembles kaolin, it containing a large proportion of alumina, and being very free from grit, and pulverize it or grind it very fine, and mix it with water to form a pasty mass. To twenty gallons of this I add from one to two gallons of boiled linseed-oil, and about one pint of alkali, the concentrated lye or potash as prepared for market being suitable for this purpose. Having added these ingredients, the whole is thoroughly mixed or ground together until about the consistency of ground white lead as usually prepared for market.

When thus prepared, the paint can be stored in vats or kegs for any desired length of time, and is in a fit condition to put in the market for sale.

To use the paint thus prepared, it is simply thinned to the proper consistency by the addition of either water or linseed-oil, as may be preferred, when it is applied with a brush in the usual manner. If desired, white lead or litharge, or both, may be added in any desired quantity, the effect of the alkali being to cause these ingredients, even when the paint is thinned with water, to unite perfectly and form a chemical union.

Paint thus prepared can be spread more rapidly and with much less labor than ordinary lead paint; and, as it forms a very smooth and even body, it is especially well adapted for covering brick walls and also rough wood walls for the outside of buildings. It is also well adapted for use as a body or foundation paint for either outside or inside painting to receive and hold a finishing coat of oil paint of any of the usual kinds. It can, of course, be made of any desired shade by the addition of the usual coloring materials, the same as in lead paints.

The herein-described proportions are such as I have found by experiment to be well adapted for ordinary use; but I do not confine myself to these special proportions, as it is obvious that they may be changed as desired without departing from the spirit of my invention.

Having thus described my invention, what I claim is—

The herein-described compound as a paint, the same consisting of clay, linseed-oil, and alkali, combined and prepared substantially as herein set forth.

FRANCIS STALING.

Witnesses:
  J. McKENNEY,
  W. C. DODGE.